(12) United States Patent
Gomes et al.

(10) Patent No.: US 11,027,660 B2
(45) Date of Patent: Jun. 8, 2021

(54) VEHICLE ARTICLE CARRIER SYSTEM HAVING SWING-IN-PLACE CROSS BARS

(71) Applicant: JAC Products, Inc., Saline, MI (US)

(72) Inventors: Gerald J. Gomes, Macomb, MI (US); Conde M. Gonzalez, Utica, MI (US); Gordon Michie, LaSalle (CA); Brendan J. Hathaway, Washington, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 16/412,761

(22) Filed: May 15, 2019

(65) Prior Publication Data

US 2019/0351834 A1   Nov. 21, 2019

Related U.S. Application Data

(60) Provisional application No. 62/672,888, filed on May 17, 2018.

(51) Int. Cl.
*B60R 9/045* (2006.01)
*B60R 9/058* (2006.01)
*B60R 11/00* (2006.01)

(52) U.S. Cl.
CPC ............. *B60R 9/045* (2013.01); *B60R 9/058* (2013.01); *B60R 2011/004* (2013.01)

(58) Field of Classification Search
CPC . B60R 9/045; B60R 9/058; B60R 9/04; B60P 7/15; Y10S 224/924
See application file for complete search history.

(56) References Cited

U.S. PATENT DOCUMENTS

| 3,670,935 | A | * | 6/1972 | Hinkston | B60R 9/10 224/497 |
| 4,364,500 | A | * | 12/1982 | Bott | B60R 9/045 224/321 |
| 5,071,050 | A | * | 12/1991 | Pudney | B60R 9/045 224/321 |
| 5,340,007 | A | * | 8/1994 | Jeuffray | B60R 9/045 224/315 |

(Continued)

*Primary Examiner* — Brian D Nash
(74) *Attorney, Agent, or Firm* — Harness, Dickey & Pierce, P.L.C.

(57) ABSTRACT

The present disclosure relates to a swing-in-place vehicle article carrier system for supporting articles above an outer body surface of a vehicle. The system has a front pair and rear pairs of support structures fixedly secured to the outer body surface. A first modular cross bar assembly is included which has a central portion, a latching module assembly secured at a first end of the central portion, and a pivot module secured at a second end of the central portion. The pivot module is coupled to one of the front pair of support structures for enabling pivoting motion of the first cross bar assembly between operative and stowed positions. In the operative position, the first modular cross bar assembly spans widthwise across the outer body surface. In the stowed position the cross bar assembly is secured to a second one of the rear pair of support structures to form a continuous span between the second ones of the pairs of front and rear support structures. The latching module includes a housing which is substantially fully inserted into the first end of the central portion to form a continuous looking surface with the central portion.

19 Claims, 4 Drawing Sheets

(56) References Cited

U.S. PATENT DOCUMENTS

| | | | | |
|---|---|---|---|---|
| 5,377,890 | A * | 1/1995 | Brunner | B60R 9/045 224/309 |
| 5,395,024 | A * | 3/1995 | Luchtenberg | B60R 9/045 224/309 |
| 5,411,196 | A * | 5/1995 | Lee, Jr. | B60P 7/135 224/315 |
| 5,511,709 | A * | 4/1996 | Fisch | B60R 9/045 224/316 |
| 5,577,649 | A * | 11/1996 | Lee, Jr. | B60P 7/135 224/315 |
| 6,286,739 | B1 * | 9/2001 | Stapleton | B60R 9/045 224/309 |
| 6,811,066 | B2 | 11/2004 | Aftanas et al. | |
| 6,959,845 | B2 | 11/2005 | Aftanas et al. | |
| 7,066,364 | B2 | 6/2006 | Kmita et al. | |
| 7,090,103 | B2 | 8/2006 | Aftanas et al. | |
| 7,448,523 | B2 | 11/2008 | Aftanas et al. | |
| 7,926,686 | B2 * | 4/2011 | Salvador | B60R 9/045 224/321 |
| 8,028,875 | B2 | 10/2011 | Kmita et al. | |
| 8,096,454 | B2 | 1/2012 | Aftanas et al. | |
| 8,251,267 | B2 | 8/2012 | Aftanas et al. | |
| 8,276,794 | B2 | 10/2012 | Aftanas | |
| 8,348,111 | B2 | 1/2013 | Heuchert et al. | |
| 8,528,799 | B2 | 9/2013 | Michie et al. | |
| 8,640,934 | B2 * | 2/2014 | Jamieson | B60R 9/04 224/321 |
| 9,616,819 | B2 | 4/2017 | Kmita | |
| 2004/0134949 | A1 * | 7/2004 | Aftanas | B60R 9/045 224/321 |
| 2004/0134950 | A1 * | 7/2004 | Kmita | B60R 9/045 224/321 |
| 2005/0017037 | A1 * | 1/2005 | Aftanas | B62H 5/00 224/321 |
| 2006/0060621 | A1 * | 3/2006 | Klinkman | B60R 9/045 224/321 |
| 2008/0252100 | A1 * | 10/2008 | Salvador | B60R 9/045 296/185.1 |
| 2013/0134194 | A1 * | 5/2013 | Moore | B60R 9/04 224/309 |

* cited by examiner

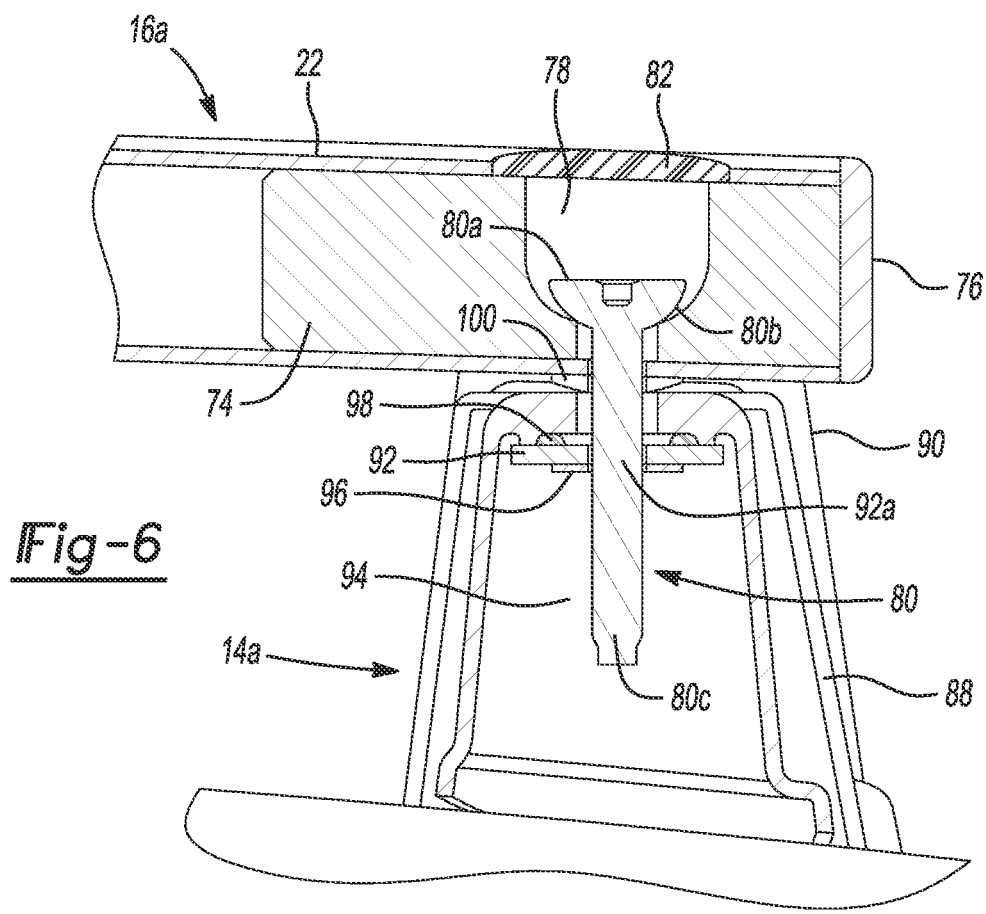
_Fig-6_
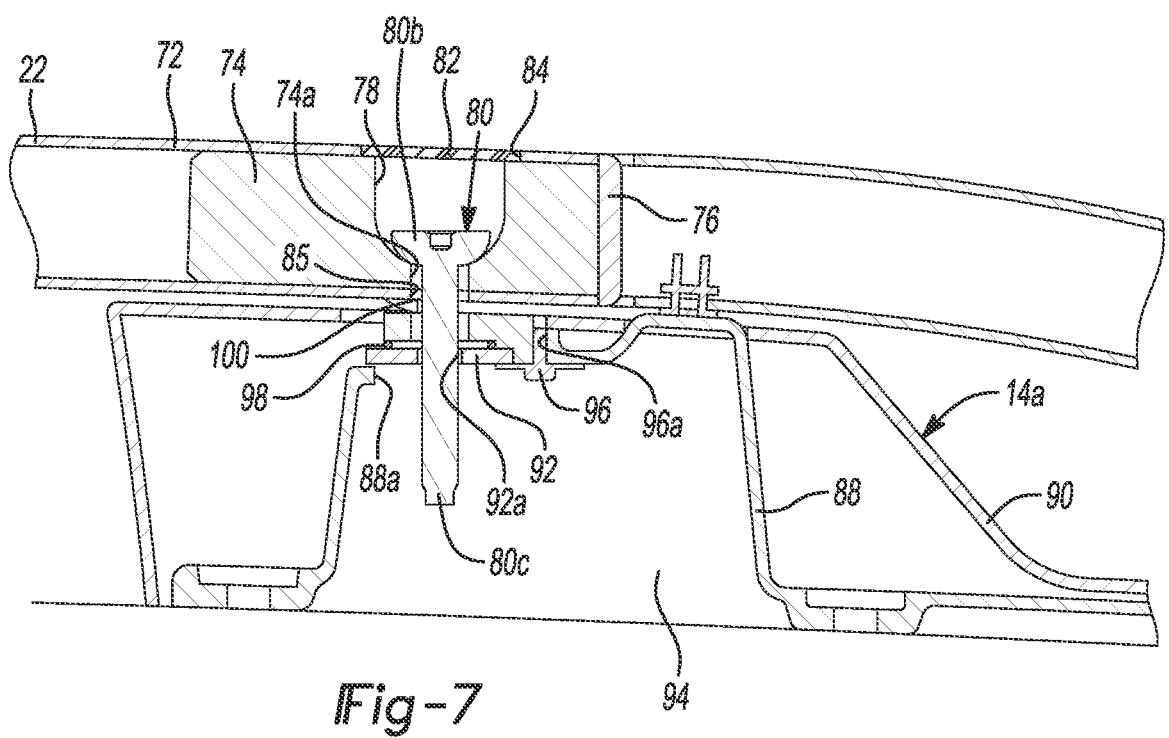
_Fig-7_

VEHICLE ARTICLE CARRIER SYSTEM HAVING SWING-IN-PLACE CROSS BARS

CROSS-REFERENCE TO RELATED APPLICATIONS

This application claims the benefit of U.S. Provisional Application No. 62/672,888, filed on May 17, 2018. The entire disclosure of the above application is incorporated herein by reference.

FIELD

The present disclosure relates to vehicle article carriers, and more particularly to a vehicle article carrier having swing-in-place cross bars, and where the cross bars include a modular construction that enables a continuous-appearing, highly aesthetic profile to be achieved with other components of the vehicle article carrier system.

BACKGROUND

The statements in this section merely provide background information related to the present disclosure and may not constitute prior art.

The interest in vehicle article carriers used on the roof portions of motor vehicles are becoming increasing desirable, in part because of the growing popularity of SUVs and station wagon style vehicles. Vehicle article carriers add significantly to the vehicle's ability to transport a wide range of articles from luggage to outdoor equipment (e.g., bicycles, kayaks, skis, etc.) above the roof surface of the vehicle. With smaller SUVs, in particular growing in popularity, the ability to carry additional cargo items above the roof of the vehicle frees up significant interior space for the occupants.

One style of vehicle article carrier that has been growing in popularity includes what are often referred to as "swing-in-place" cross bars. The assignee of the present disclosure is a leader in the manufacture of vehicle article carrier systems that include "swing-in-place" cross bars, and such systems are shown in U.S. Pat. Nos. 8,028,875; 7,448,523; 7,090,103; 7,066,364; 6,811,086; and 5,385,285, the teachings of which are hereby incorporated by reference into the present disclosure. With a vehicle article carrier having swing-in-place style cross bars, the cross bars may be positioned in an "operative" position where they extend perpendicularly relative to the longitudinal length of the vehicle, with a forward one of the cross bars being supported by a pair of front support structures fixedly mounted to the roof surface of the vehicle, and the rearward crossbar supported by a pair of rear support structures which are likewise fixedly secured to the roof surface. The cross bars are held a small distance above the roof surface and can be used to support a wide range of articles thereon.

The swing-in-place style cross bars of a vehicle article carrier system can also be placed in "stowed" positions when not needed for use. In their stowed positions, the cross bars extend parallel to the major longitudinal length of the vehicle and such that the one end of each cross bar rests adjacent to, and is releasably coupled to, its associated forward support structure, while the opposite end of each cross bar rests adjacent to, and is pivotally or releasably coupled to, its associated rear support structure. Maintaining the cross bars in their stowed positions when not needed for use is advantageous in that this can help to reduce aerodynamic drag on the vehicle, as well as provide an even more pleasing aesthetic appearance for the vehicle.

With heretofore developed swing-in-place cross bars, however, the construction of the cross bar at its opposite ends does not necessarily flow smoothly such that, when in the stowed position, the cross bar clearly is visible as a distinctly separate component from the front and rear support structures. This is also due in part to the fact that an end support latching assembly at one end of the cross bar is typically made from plastic, and projects significantly from one end of a metallic center portion of the cross bar, while a plastic pivoting end assembly similarly projects significantly from the opposite end of the cross bar. Thus, the two end support structures, typically being plastic, differ significantly in appearance from the central section of the cross bar, which typically has a polished metallic or chrome-like look, which causes a substantial visible aesthetic difference on the visible surfaces (in the industry the visible surface is termed a "Class A" surface). Likewise the front and rear support structures, which are fixedly secured to the vehicle roof, often also have a highly polished appearance that forms a Class A surface. Thus, when the cross bars are positioned in their stowed positions, the outer ends of the cross bars do not blend in with, and form a "continuous", smooth profile, with the front and rear support structures. More specifically, the stowed cross bars do not generally provide the appearance of a continuous Class A surface across the full length of the cross bar and its support structures. Typically, significant gaps are present between the end support structures at the opposite ends of the cross bar and the front and rear support structures. From a functional standpoint, this can also give rise to the possibility of some additional wind noise or a reduction in aerodynamic efficiency of the vehicle article carrier, even when the cross bars are secured in their stowed positions.

Accordingly, it would be highly desirable to provide a vehicle article carrier having swing-in-place cross bars that minimize the gaps present between the outer ends of each cross bar and its front and rear support structures, and also which forms an even more smooth, continuous profile with the front and rear support structures when each cross bar is in its stowed position, and also which presents a substantially continuous Class A surface along substantially a full length of each cross bar and its support structures when positioned in its stowed position.

SUMMARY

This section provides a general summary of the disclosure, and is not a comprehensive disclosure of its full scope or all of its features.

In one aspect the present disclosure relates to a vehicle article carrier system for supporting articles above an outer body surface of a vehicle. The system comprises a front pair of first and second ones of support structures fixedly secured to the outer body surface of the vehicle, and a rear pair of first and second ones of support structures fixedly secured to the outer body surface of the vehicle. A first modular cross bar assembly is included which has a central portion, a latching module assembly secured at a first end and of the central portion, and a pivot module secured at a second end of the central portion. The pivot module is coupled to one of the front pair of first and second support structures for enabling pivoting motion of the first modular cross bar assembly between an operative position and a stowed position. In the operative position, the first modular cross bar assembly is secured at the first end to the first one of the front pair of support structures, spanning widthwise across a major portion of the outer body surface. In the stowed position, the first modular cross bar assembly is secured to a second one of the rear pair of support structures to form a continuous span between the second ones of the front and rear pairs of support structures. The latching module includes a housing which is substantially fully inserted into the first end of the central portion, to form an appearance of a continuous looking surface with the central portion.

In another aspect the present disclosure relates to a vehicle article carrier system for supporting articles above an outer body surface of a vehicle. The system comprises a front pair of first and second ones of support structures fixedly secured to the outer body surface of the vehicle, a rear pair of first and second support structures fixedly secured to the outer body surface of the vehicle, and a first modular cross bar assembly. The first modular cross bar assembly has a central portion, a latching module assembly secured at a first end and of the central portion, and a pivot module secured at a second end of the central portion. The pivot module is coupled to the second one of the front pair of first support structures for enabling pivoting motion of the first modular cross bar assembly. A second modular cross bar assembly is included which has an additional central portion, an additional latching module assembly secured at a first end of the additional central portion, and an additional pivot module secured at a second end of the additional central portion. The additional pivot module is coupled to the first one of the rear pair of support structures for enabling pivoting motion of the second modular cross bar assembly. The first modular cross bar assembly is movable between an operative position extending width wise across the outer body surface between the front pair of support structures, and a stowed position extending between the second ones of the front and rear pairs of support structures. The second modular cross bar assembly is movable between an operative position extending width wise across the outer body surface between the rear support structures, and a stowed position extending between the first ones of the front and rear pairs of support structures. The latching module and the pivot module each are substantially fully housed within the first and second ends, respectively, of the central portion to form a substantially continuous looking appearance. The additional latching module and the additional pivot module each are substantially fully housed within the first and second ends, respectively, of the additional central portion, to form a substantially continuous looking appearance.

In still another aspect the present disclosure provides a vehicle article carrier system for supporting articles above an outer body surface of a vehicle. The system includes a front pair of first and second ones of support structures fixedly secured to the outer body surface of the vehicle, and a rear pair of first and second support structures fixedly secured to the outer body surface of the vehicle. A first modular cross bar assembly is provided which includes a central portion, a latching module assembly secured at a first end of the central portion, and which is insertable into the first end as a fully assembled subassembly. In addition, a pivot module is provided which is secured at a second end of the central portion. The pivot module is coupled to the second one of the front pair of support structures for enabling pivoting motion of the first modular cross bar assembly. A second modular cross bar assembly is included which has an additional central portion, an additional latching module assembly secured at a first end of the additional central portion, and an additional pivot module secured at a second end of the additional central portion. The additional pivot module is coupled to the first one of the rear pair of support structures for enabling pivoting motion of the second modular cross bar assembly. The first modular cross bar assembly is movable between an operative position extending width wise across the outer body surface between the front pair of support structures, and a stowed position extending between the second ones of the front and rear pairs of support structures. The second modular cross bar assembly is movable between an operative position extending width wise across the outer body surface between the rear pair of support structures, and a stowed position extending between the first ones of the front and rear pairs of support structures. The latching module and the pivot module each are substantially fully housed within the first and second ends, respectively, of the central portion to form a substantially continuous looking appearance. The additional latching module and the additional pivot module each are substantially fully housed within the first and second ends, respectively, of the additional central portion, to form a substantially continuous looking appearance. The latching module and the additional latching module each include a housing, a spring biased latching element and an actuating element for moving the spring biased latching element between latched and unlatched positions. The central portion and the additional central portion each include an access opening for receiving a respective one of the actuating element such that an upper surface of the actuating element forms a generally continuous surface with an upper surface of one of the central portion or the additional central portion.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6 is a cross sectional view showing one of the pivot modules coupled to one of its associated support structures; and FIG. 7 is a cross-sectional view taken in accordance with section line 7-7 in FIG. 1 showing the pivot module of one of the cross bar assemblies coupled to its associated support structure.

DETAILED DESCRIPTION

Figure 1:
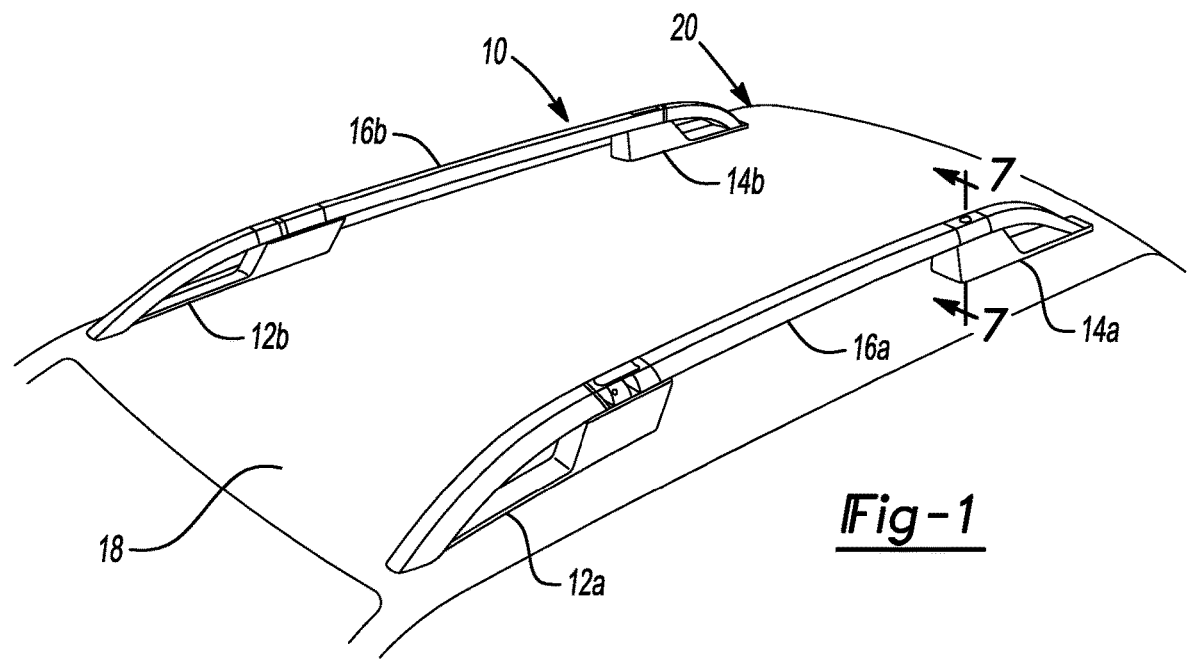
FIG. 1 is a perspective view of a vehicle article carrier system having swing-in-place cross bar assemblies in accordance with one embodiment of the present disclosure, and wherein the cross bar assemblies are shown in their stowed positions.

The following description is merely exemplary in nature and is not intended to limit the present disclosure, application, or uses. It should be understood that throughout the drawings, corresponding reference numerals indicate like or corresponding parts and features.

Referring to FIG. 1 there is illustrated a vehicle article carrier system 10 in accordance with one embodiment of the present disclosure. The system 10 in this example includes a pair of front support structures 12a and 12b, a pair of rear support structures 14a and 14b, a first cross bar assembly 16a and a second cross bar assembly 16b. The front support structures 12a/12b and the rear support structures 14a/14b are each attached fixedly to an outer body surface 18 of a vehicle 20. In this example, front support structure 12a and rear support structure 14b are structurally similar in construction, while support structures 12b and 14a are structurally similar in construction. The reasons for this will be explained in the following paragraphs.

In FIG. 1 the cross bar assemblies 16a/16b are shown in their "stowed" positions, which are the positions the cross bar assemblies may be secured in when not needed for use. In their stowed positions, each of the cross bar assemblies 16a/16b provide the appearance of a continuous, integrated component with their respective support structures 12a/14a or 12b/14b. In one embodiment the support structures 12a/12b and 14a/14b, as well as the cross bar assemblies 16a/16b, have "Class A" surfaces. It will be noted also in FIG. 1 that the gaps separating the ends of each cross bar assembly 16a and 16b from its associated pair of front/rear support structures 12a/14a or 12b/14b is substantially eliminated. This helps significantly to provide a highly aesthetically pleasing appearance, as well as to reduce the possibility of wind noise and to increase the aerodynamic efficiency of the system 10 when the cross bar assemblies are in their stowed positions.

Figure 2:
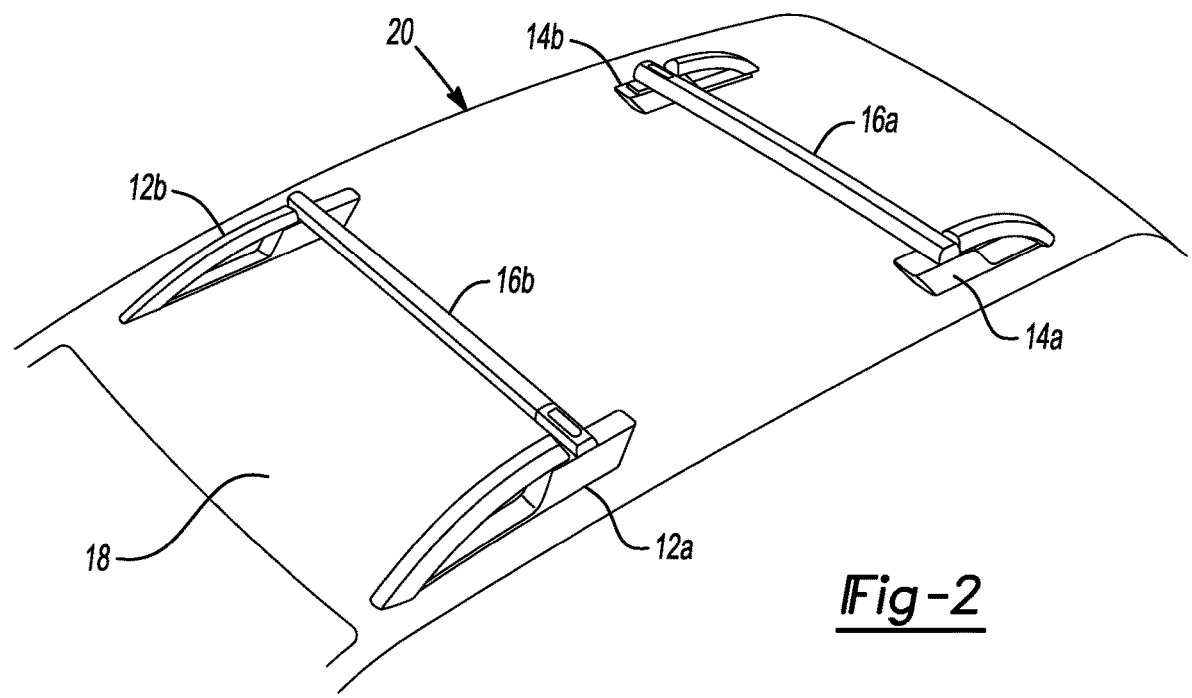
FIG. 2 is a perspective view of the vehicle article carrier system of FIG. 1 but with the cross bar assemblies shown in their operative positions.

FIG. 2 illustrates the cross bar assemblies 16a and 16b when the cross bar assemblies are positioned in their operative positions. In this example the first cross bar assembly 16a is positioned as a rear cross bar assembly and the second cross bar assembly 16b is positioned as a front cross bar assembly. As will be explained further in the following paragraphs, the swing-in-place construction of the system 10 enables the cross bar assemblies 16a and 16b to be swung from their stowed orientations (FIG. 1) into the operative orientations (FIG. 2) quickly and easily by a single individual, in just seconds, and without the use of separate tools or complex disassembly/reassembly procedures. In the operative position shown in FIG. 2, the cross bar assemblies extend perpendicularly between associated pairs of the support structures 12a/12b and 14a/14b and can be used to support a wide variety of articles thereon (e.g., luggage, bicycles, skis, etc.) either with or without separate attachment accessories (e.g., bicycle racks, article bins or trays, etc.).

Figure 3:
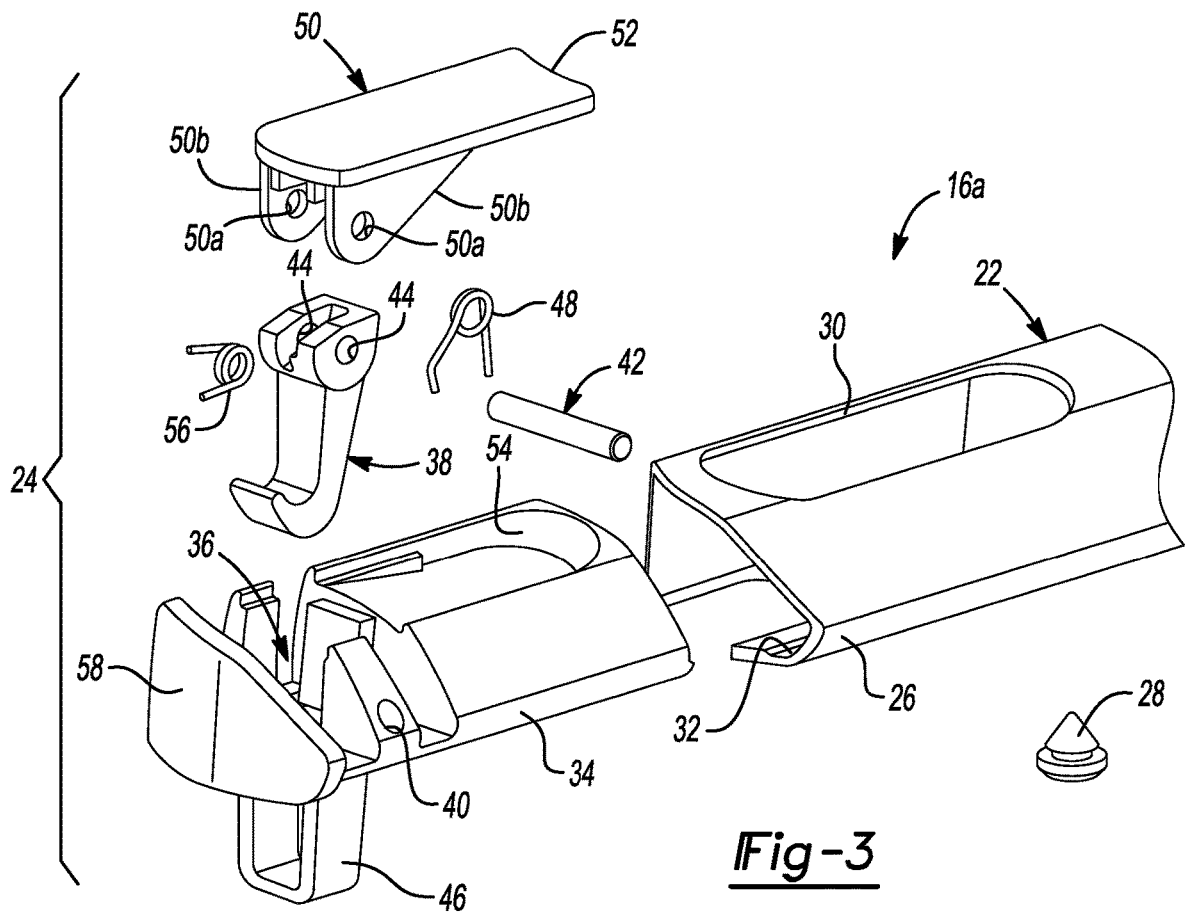
FIG. 3 is an exploded perspective view of a latching module that is assembled into one end of each of the cross bar assemblies.

Referring to FIG. 3, the construction of cross bar assembly 16a can be seen in greater detail. The two cross bar assemblies 16a and 16b in this example are identical in construction, so only cross bar 16a will be discussed. However, it will be appreciated that the construction of the cross bar assemblies 16a and 16b need not be perfectly identical. It is a significant advantage of the present disclosure that the modular construction of the cross bar assemblies 16a and 16b enables the appearance of a continuous Class A surface for substantially an entire length of each cross bar assembly. With previous swing-in-place cross bar designs, a latching end support at one end and a pivoting end support structure at the opposite end projected significantly outwardly from the opposite ends of a central cross bar section. The latching end support structure and pivoting end support structure have typically been made from plastic or die cast components, and thus they generally did not form a continuous appearance with the central portion of the cross bar. Accordingly, even if the central portion of the cross bar had a Class A surface, the latching end support and the pivoting end support typically did not. Thus the cross bar assemblies did not appear to "blend in" and be continuous Class A surfaces with the front and rear supporting structures. The system 10 changes that and provides cross bar assemblies 16a and 16b which help to provide a substantially continuous Class A appearing surface with the front and rear support structures 12/14 when in their stowed positions.

With continuing reference to FIG. 3, the cross bar assembly 16a may include a central portion 22, which may be an extruded or roll formed component, and which is typically formed from aluminum or steel. In either event, the central portion 22 preferably has a Class A surface or similar highly polished surface. A latching module assembly 24, when fully assembled, may be inserted almost entirely into a first end 26 of the central portion 22 and secured therein via a suitable fastener 28. Fastener 28 may be a standard threaded fastener. The first end 26 of the central portion 22 may include an access opening 30 and a notch 32.

With further reference to FIG. 3, the latching module assembly 24 may include a housing 34, which may be a molded plastic component. The housing 34 may include a first recess 36 for receiving a latching element 38. The housing 34 may also include a pair of aligned bores 40 which receive a pivot pin 42. The pivot pin 42 may extend through a bore 44 in the latching element 38. When assembled, the latching element 38 rests within the recess 36 and is free to pivot to a limited degree, and is also partially circumscribed by a projecting cage portion 46 of the housing 34. A torsion spring 48 is positioned within the housing 34 and includes leg portions which abut a portion of the housing 34 and the latching element 38, which biases the latching element into a latched position.

The latching module 24 also includes an actuating element 50 having flanges 50b which each include an aligned hole 50a. The actuating element 50 is pivotally coupled to the housing 34 which extends through the holes 50a. The actuating element 50 includes a manually graspable end portion 52 which is shaped to rest within an upper recess 54 in the housing 34 and rest generally co-planar with an upper surface of the housing 34. A separate torsion 56 spring may be positioned over the pivot pin 42 such that its leg portions abut a portion of the actuating lever 50 and a portion of the housing 34 within the recess 36 to bias the actuating lever into a closed position (i.e., held within the upper recess 54). The actuating element 52 may include an undercut or relief portion (not shown) at its manually graspable end portion 52 to enable it to be grasped and lifted with one or more fingers. The shape of the actuating element 52 is also similar to the shape of the access opening 30, but just slightly smaller, so that it can be lifted out from the access opening without interference.

Once fully assembled, the entire latching module 24 may be slid into the first end 26 of the cross bar central portion 22. The housing 34 is shaped in accordance with the cross sectional shape of the central portion 22 such that it forms a tight, wobble free connection, and is substantially housed within the central portion 22. Only an outermost cap surface 58 of the housing 34, which is also shaped generally in accordance with the cross sectional shape of the cross bar central portion 22, projects from the first end 26 of the central portion 22; otherwise, substantially the entire latching module 24 is housed within the central portion 22.

Figure 4:
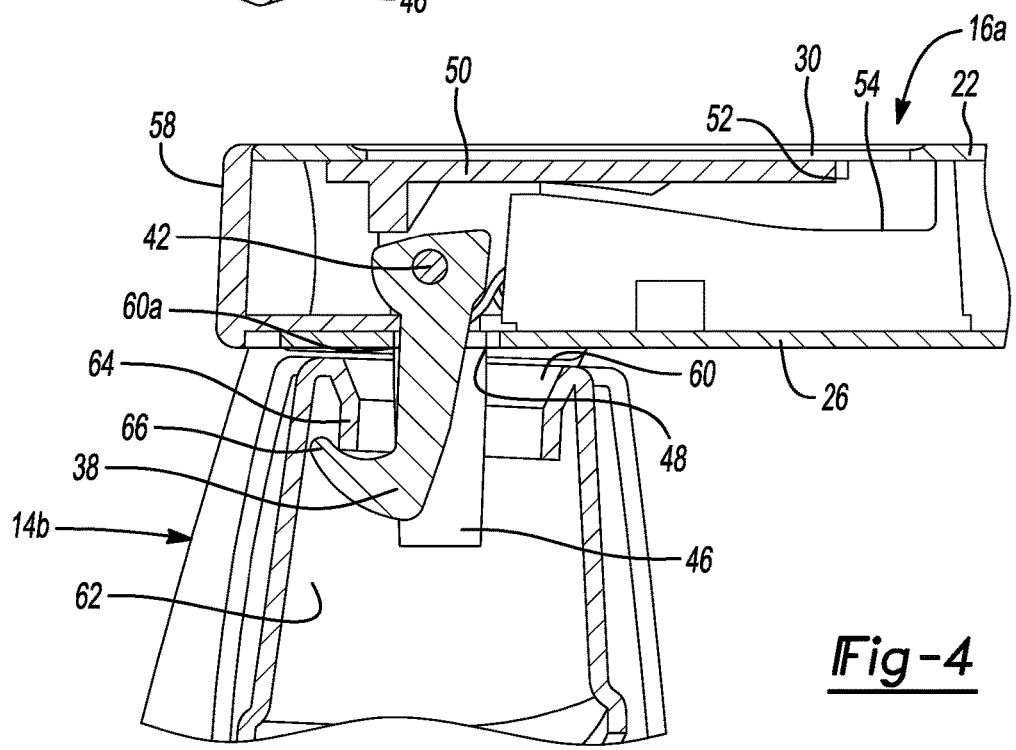
FIG. 4 is a cross sectional side view of one of the latching modules secured to one of it associated support structures.

With further reference to FIG. 4, a cover plate 60 having an opening 60a is included which is securely attached by suitable fasteners (not shown) to the front support structure 12a. It will be appreciated that the front support structure 12a and the rear support structure 14b are configured to latch with the latching module 24 of either cross bar assemblies 16a or 16b. Thus, when in the stowed position, the front support structure 12a is coupled to the latching module 24 of the first cross bar assembly 16a, while in the operative position, the rear support structure 14b couples to the latching module 24 of the first cross bar assembly 16a. Similarly, when the second cross bar assembly 16b is in its stowed position, the rear support structure 14b will be coupled to the latching module 24 of the second cross bar assembly 16b. When the second cross bar assembly 16b is in its operative position, its latching module 24 will be coupled to the front support structure 12a.

As further shown in FIG. 4, the front support structure 12a may include a hollow portion with an inwardly formed lip 64. A hook end 66 of the latching element 38 engages with the lip 64 when the first end 26 of the cross bar assembly 16a is rested on the front support structure 12a. It will be noted that the projecting cage portion 46 is able to pass through the opening 60a in the cover plate 60 as the first end 26 of the cross bar 16a is lowered into contact with the cover plate 60. A curving portion 68 of the latching element 38 makes contact with the opening 60a and is forcibly retracted partially into the projecting cage portion 46 as the projecting cage portion passes through the opening 60a, until the biasing force of the torsion spring 48 urges the hook end 66 rotationally into engagement with the lip 64. At this point the latching module 24 holds the cross bar assembly 16a securely to the front support structure 12a.

Figure 5:
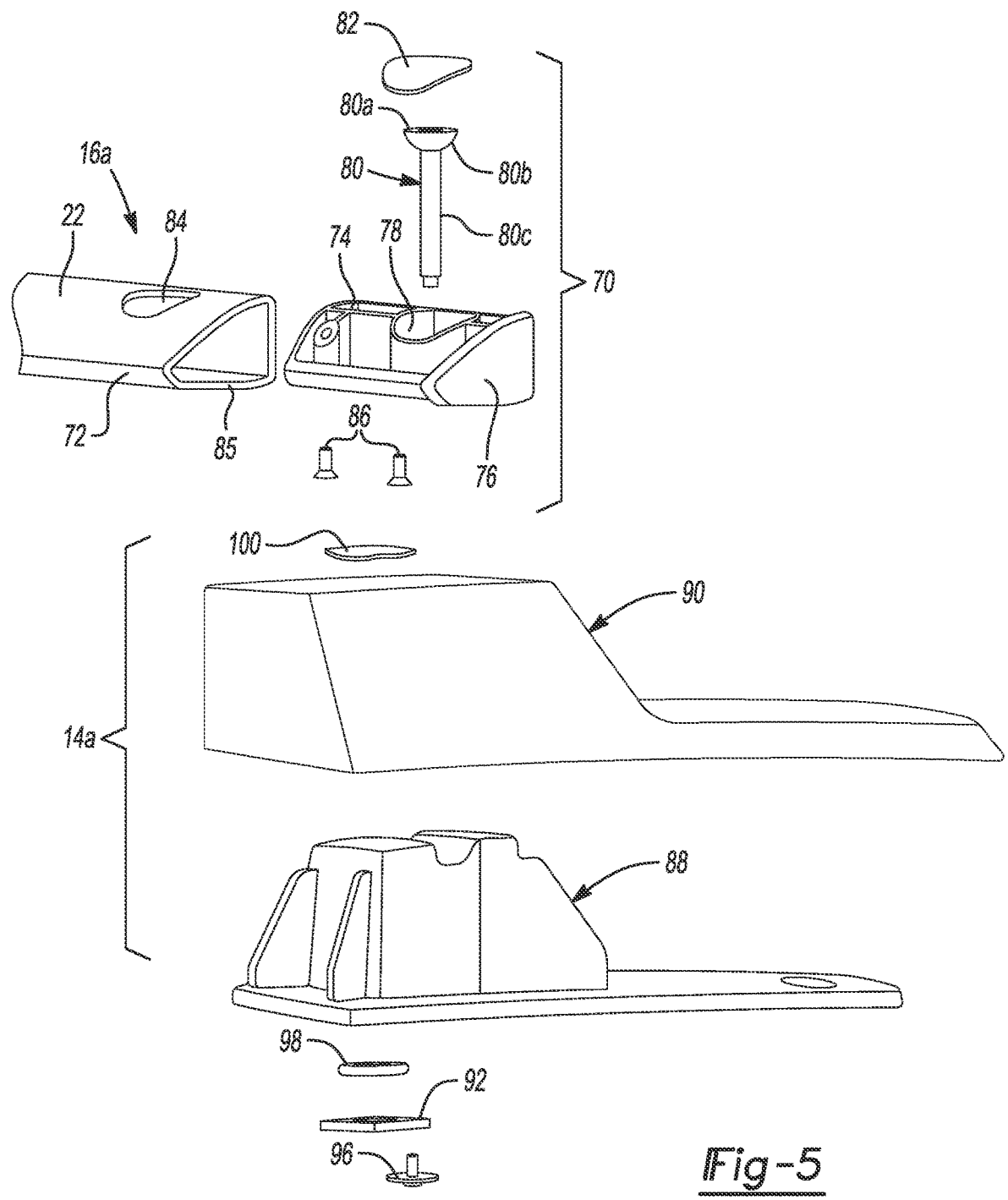
FIG. 5 is an exploded perspective view of a pivot module which is coupled at one end of each of the cross bar assemblies.

Referring to FIG. 5, cross bar assembly 16a can also be seen to include a pivot module 70 which is inserted into a second end 72 of the central section 22 of the cross bar assembly 16a. In this embodiment of the system 10, the second cross bar assembly 16b likewise includes the same pivot module 70 in one of its ends. The pivot module 70 has a housing 74 that is shaped in accordance with a cross sectional shape of the cross bar central section 22 and is inserted into the second end 72 such that it is virtually entirely housed in the second end 72. Only an outer cover portion 76 is visible after the pivot module 70 is fully assembled to the cross bar central section 22.

With further reference to FIG. 5, the housing 74 may include a bore 78 through which a fastener 80 is inserted. A snap on cap 82 may be positioned over a head portion 80a of the fastener 80. The head portion 80a includes a spherical undersurface 80b, the purpose of which will be described momentarily. An access opening 84 in an upper surface of the second end 72, and a notch 85 in the lower surface of the second end 72 of the cross bar central section 22, allows the fastener 80 to be inserted into the housing 74 after the housing 74 is inserted into the second end 72. Threaded fasteners 86 may extend through openings (not shown) in a lower surface of the central section 22 and used to secure the housing 74 fixedly within the second end 72 of the cross bar central section 22. The cap 82 may then be installed to cover the access opening 84.

The rear support structure 14a in this example is substantially identical to the front support structure 12b, as both of these components are responsible for supporting one end of each cross bar assembly 16a or 16b for pivoting motion, as well as a small degree of elevational movement. FIG. 5 also shows that the rear support structure 14a includes a base portion 88 over which a decorative cover assembly 90 may be secured, for example with a snap fit construction or optionally with one or more suitable fasteners. The base portion 88 may be fixedly secured to the outer body surface 18 of the vehicle 20 by a suitable fastener (e.g., a well-known RIVNUT® style fastener, or any other suitable fastening element).

With brief reference to FIG. 7, the housing 74 can be seen to include an opening 74a through which a shaft portion 80c of the fastener 80 extends into the base portion 88.

With further reference to FIGS. 5, 6 and 7, the support structure 14a includes a tap plate 92 which is held in position within a hollow interior area 94 of the base portion 88 by a fastener 96. The fastener 96 engages a threaded bore 96a in the housing 88, as shown in FIG. 7, and also engages an edge of the tap plate 92 while an opposite edge of the tap plate 92 engages a lip portion 88a of the housing 88. The tap plate 92 has a hole 92a through which the threaded shaft portion 80c of the fastener 80 extends. The tap plate 92 holds an O-ring 98 generally coaxially aligned with the shaft portion 80c of the fastener 80. A slightly spherical washer 100 is positioned to support the pivot module 70 on the support structure housing 88. The O-ring 98 and the spherical undersurface 80b of the fastener 80, working cooperatively, allow a small degree of elevational pivoting motion of the cross bar assembly 16a about the fastener 80 when the cross bar assembly 16a needs to be moved to between its stowed and operative positions.

The system 10 thus provides the appearance of two integrally formed support rails having highly polished or a Class A surface, along substantially their full lengths, when the cross bar assemblies 16a and 16b are in their stowed positions. The swing-in-place construction of the cross bar assemblies 16a and 16b enables each to be positioned in a stowed orientation or an operative orientation quickly and easily, and without the need for any separate tools. The modular construction of the cross bars 16a and 16b, with their latching modules 24 and pivot modules 70, enable gaps between the central cross bar central section 22 and the front and rear support structures 12a/14a or 12b/14b to be minimized, to preserve the appearance of a continuous support rail when the cross bar assemblies are in their stowed positions, as well as to minimize airflow disruptions around these areas of the system 10, which might possibly lead to a reduction in the aerodynamic efficiency of the system 10.

While the system 10 has been described as being implemented on an outer body surface 18 (i.e., roof surface) of the vehicle 10, it will be appreciated that the system could just as readily be adapted for use on other areas of different types of vehicles with little or no modification. For example, the system 10 could be used on a pickup truck, wherein the cross bar assemblies 16a and 16b function as grab rails along the bed sidewalls when in their stowed positions, and which can be moved into their operative positions to extend crosswise across the bed of the pickup when needed to support articles above the truck bed. Accordingly, the system 10 is not limited to use on only one type of vehicle, but is rather expected to find utility with a wide variety of vehicles including, but not limited to, SUVs, sedans, pickup trucks, mini-vans and full size vans and crossovers.

While various embodiments have been described, those skilled in the art will recognize modifications or variations which might be made without departing from the present disclosure. The examples illustrate the various embodiments and are not intended, to limit the present disclosure. Therefore, the description and claims should be interpreted liberally with only such limitation as is necessary in view of the pertinent prior art.

What is claimed is:

1. A vehicle article carrier system for supporting articles above an outer body surface of a vehicle, the system comprising:
   a front pair of first and second ones of support structures fixedly secured to the outer body surface of the vehicle;
   a rear pair of first and second ones of support structures fixedly secured to the outer body surface of the vehicle;
   a first modular cross bar assembly having a central portion, a latching module assembly secured at a first end of the central portion, and a pivot module secured at a second end of the central portion, the pivot module being coupled to one of the front pair of first and second support structures for enabling pivoting motion of the first modular cross bar assembly between:
      an operative position, wherein the first modular cross bar assembly is secured at the first end to the first one of the front pair of support structures, spanning widthwise across a major portion of the outer body surface; and
      a stowed position, wherein the first modular cross bar assembly is secured to a second one of the rear pair of support structures, to form a continuous span between the second ones of the pairs of front and rear support structures;
   the latching module including a housing which is substantially fully inserted into the first end of the central portion, to form an appearance of a continuous surface with the central portion; and
   wherein the housing of the latching module is shaped in accordance with a cross sectional shape of an interior wall portion of the central portion of the first modular cross bar assembly, to enable insertion into the central portion from one open end of the central portion, as a fully assembled subassembly.

2. The system of claim 1, wherein the pivot module includes a housing which is inserted substantially fully into the second end of the central portion of the cross bar assembly, such that the pivot module forms an appearance of a continuous surface with the central portion.

3. The system of claim 1, further including a second modular cross bar assembly for assisting in supporting the articles above the outer body surface of the vehicle.

4. The system of claim 3, wherein the second modular cross bar assembly includes:
   an additional central portion having first and second ends;
   an additional latching module secured at the first end of the additional central portion;
   an additional pivot module secured at the second end of the additional central portion;
   the additional pivot module being secured at the first one of the pair of rear support structures for pivoting movement thereabout; and
   the additional latching module:
      being securable to the first one of the front pair of support structures when the second modular cross bar assembly is in a stowed orientation, to form a continuous span between the first ones of the front and rear pairs of support structures; and
      being securable to the second one of the rear pair of support structures when the second modular cross bar assembly is in an operative position spanning widthwise across the outer body surface.

5. The system of claim 4, wherein the additional latching module is housed substantially fully within the first end of the additional central portion, and wherein the additional pivot module is housed substantially within the second end of the additional central portion.

6. The system of claim 1, wherein the latching module includes a latching element having a hook shaped end, and a biasing spring which biases the hook shaped end into a latching position.

7. The system of claim 6, wherein the first one of the front pair of support structures includes a cover plate with an aperture permitting the latching element of the latching module to project therethrough into an interior area of the first one of the front pair of support structures when the first modular cross bar assembly is secured in the operative position.

8. The system of claim 7, wherein the first one of the front pair of support structures a lip positioned within the interior area for engaging with the hook end as the hook end is fully lowered through the aperture in the cover plate.

9. The system of claim 1, wherein:
   the first end of the central portion includes an access opening; and
   the latching module includes a latching element and an actuating element graspable with at least one finger for lifting the latching element from a latched position to an unlatched position; and
   the actuating element being shaped to fit within the access opening and to be generally flush with an upper surface of the central portion when the latching element is in the latched position.

10. The system of claim 1, wherein the pivot module includes a housing having an outer cover portion, and wherein the housing is substantially housed within the second end of the central portion, and wherein only the outer cover portion extends out from the second end of the central portion.

11. A vehicle article carrier system for supporting articles above an outer body surface of a vehicle, the system comprising:
   a front pair of first and second ones of support structures fixedly secured to the outer body surface of the vehicle;
   a rear pair of first and second ones of support structures fixedly secured to the outer body surface of the vehicle;
   a first modular cross bar assembly having a central portion, a latching module assembly secured at a first end and of the central portion, and a pivot module secured at a second end of the central portion, the pivot module being coupled to the second one of the front pair of support structures for enabling pivoting motion of the first modular cross bar assembly:
   a second modular cross bar assembly having an additional central portion, an additional latching module assembly secured at a first end of the additional central portion, and an additional pivot module secured at a second end of the additional central portion, the additional pivot module being coupled to the first one of the rear pair of support structures for enabling pivoting motion of the second modular cross bar assembly:
   the first modular cross bar assembly being movable between an operative position extending width wise across the outer body surface between the front pair of support structures, and a stowed position extending between the second ones of the front and rear pairs of support structures;
   the second modular cross bar assembly being movable between an operative position extending width wise across the outer body surface between the rear support structures, and a stowed position extending between the first ones of the front and rear support structures;

the latching module and the pivot module each being substantially fully housed within the first and second ends, respectively, of the central portion to form a substantially continuous looking appearance;

the additional latching module and the additional pivot module each being substantially fully housed within the first and second ends, respectively, of the additional central portion, to form a substantially continuous looking appearance;

each of the pivot module and the additional pivot module comprising:
  a modular assembly that is insertable into a respective one of the central portion or the additional central portion as a single subassembly, wherein the pivot module and the additional pivot module each include; and
  a housing including an outer cover portion; and
  wherein only the outer cover portion is visible once the housing is secured within the second end of the central portion or the additional central portion.

12. The system of claim 11, wherein each of the latching module and the additional latching module comprise:
  a housing including an outermost cap surface, and wherein only the outermost cap surface is visible once the housing is secured within the first end of its respective central portion or additional central portion.

13. The system of claim 11, wherein:
  the latching module includes a housing, a spring biased latching element, and an actuating element for moving the spring biased actuating element between a latched position and an unlatched position; and
  wherein the central portion of the first modular cross bar assembly includes an access opening shaped in accordance with the actuating element, such that the actuating element forms a substantially continuous surface portion with an upper surface of the central portion when the actuating element is in a closed position resting in the access opening.

14. The system of claim 11, wherein the housing of the latching module has a cross sectional shape in accordance with a cross sectional shape of the central portion of the first modular cross bar assembly.

15. A vehicle article carrier system for supporting articles above an outer body surface of a vehicle, the system comprising:
  a front pair of first and second ones of support structures fixedly secured to the outer body surface of the vehicle;
  a rear pair of first and second support structures fixedly secured to the outer body surface of the vehicle;
  a first modular cross bar assembly having a central portion, a latching module assembly secured at a first end of the central portion and insertable into the first end as a fully assembled subassembly, and a pivot module secured at a second end of the central portion, the pivot module being coupled to the second one of the front pair of first support structures for enabling pivoting motion of the first modular cross bar assembly:
  a second modular cross bar assembly having an additional central portion, an additional latching module assembly secured at a first end of the additional central portion, and an additional pivot module secured at a second end of the additional central portion, the additional pivot module being coupled to the first one of the rear pair of support structures for enabling pivoting motion of the second modular cross bar assembly:
  the first modular cross bar assembly being movable between an operative position extending width wise across the outer body surface between the front pair of support structures, and a stowed position extending between the second ones of the front and rear pairs of support structures;
  the second modular cross bar assembly being movable between an operative position extending width wise across the outer body surface between the rear support structures, and a stowed position extending between the first ones of the front and rear support structures;
  the latching module and the pivot module each being substantially fully housed within the first and second ends, respectively, of the central portion to form a substantially continuous looking appearance; and
  the additional latching module and the additional pivot module each being substantially fully housed within the first and second ends, respectively, of the additional central portion, to form a substantially continuous looking appearance;
  the latching module and the additional latching module each including:
  a housing, a spring biased latching element and an actuating element for moving the spring biased latching element between latched and unlatched positions; and
  wherein the central portion and the additional central portion each include:
    an access opening for receiving a respective one of the actuating element such that an upper surface of the actuating element forms a generally continuous surface with an upper surface of one of the central portion or the additional central portion.

16. A vehicle article carrier system for supporting articles above an outer body surface of a vehicle, the system comprising:
  a front pair of first and second ones of support structures fixedly secured to the outer body surface of the vehicle;
  a rear pair of first and second ones of support structures fixedly secured to the outer body surface of the vehicle;
  a first modular cross bar assembly having a central portion, a latching module assembly secured at a first end of the central portion, and a pivot module secured at a second end of the central portion, the pivot module being coupled to one of the front pair of first and second support structures for enabling pivoting motion of the first modular cross bar assembly between:
    an operative position, wherein the first modular cross bar assembly is secured at the first end to the first one of the front pair of support structures, spanning widthwise across a major portion of the outer body surface; and
    a stowed position, wherein the first modular cross bar assembly is secured to a second one of the rear pair of support structures, to form a continuous span between the second ones of the pairs of front and rear support structures;
  the latching module including a housing which is substantially fully inserted into the first end of the central portion, to form an appearance of a continuous surface with the central portion; and
  wherein the latching module housing includes an outermost cap surface, and wherein only the outermost cap surface is visible once the latching module is secured within the first end of the central portion of the first modular cross bar assembly.

17. A vehicle article carrier system for supporting articles above an outer body surface of a vehicle, the system comprising:
- a front pair of first and second ones of support structures fixedly secured to the outer body surface of the vehicle;
- a rear pair of first and second ones of support structures fixedly secured to the outer body surface of the vehicle;
- a first modular cross bar assembly having a central portion, a latching module assembly secured at a first end of the central portion, and a pivot module secured at a second end of the central portion, the pivot module being coupled to one of the front pair of first and second support structures for enabling pivoting motion of the first modular cross bar assembly between:
  - an operative position, wherein the first modular cross bar assembly is secured at the first end to the first one of the front pair of support structures, spanning widthwise across a major portion of the outer body surface; and
  - a stowed position, wherein the first modular cross bar assembly is secured to a second one of the rear pair of support structures, to form a continuous span between the second ones of the pairs of front and rear support structures;
- the latching module including a housing which is substantially fully inserted into the first end of the central portion, to form an appearance of a continuous surface with the central portion; and
- wherein the latching module includes a latching element having a hook shaped end, and a biasing spring which biases the hook shaped end into a latching position.

18. A vehicle article carrier system for supporting articles above an outer body surface of a vehicle, the system comprising:
- a front pair of first and second ones of support structures fixedly secured to the outer body surface of the vehicle;
- a rear pair of first and second ones of support structures fixedly secured to the outer body surface of the vehicle;
- a first modular cross bar assembly having a central portion, a latching module assembly secured at a first end of the central portion, and a pivot module secured at a second end of the central portion, the pivot module being coupled to one of the front pair of first and second support structures for enabling pivoting motion of the first modular cross bar assembly between:
  - an operative position, wherein the first modular cross bar assembly is secured at the first end to the first one of the front pair of support structures, spanning widthwise across a major portion of the outer body surface; and
  - a stowed position, wherein the first modular cross bar assembly is secured to a second one of the rear pair of support structures, to form a continuous span between the second ones of the pairs of front and rear support structures;
- the latching module including a housing which is substantially fully inserted into the first end of the central portion, to form an appearance of a continuous surface with the central portion; and
- the first end of the central portion includes an access opening;
- the latching module includes a latching element and an actuating element graspable with at least one finger for lifting the latching element from a latched position to an unlatched position; and
- the actuating element being shaped to fit within the access opening and to be generally flush with an upper surface of the central portion when the latching element is in the latched position.

19. A vehicle article carrier system for supporting articles above an outer body surface of a vehicle, the system comprising:
- a front pair of first and second ones of support structures fixedly secured to the outer body surface of the vehicle;
- a rear pair of first and second ones of support structures fixedly secured to the outer body surface of the vehicle;
- a first modular cross bar assembly having a central portion, a latching module assembly secured at a first end of the central portion, and a pivot module secured at a second end of the central portion, the pivot module being coupled to one of the front pair of first and second support structures for enabling pivoting motion of the first modular cross bar assembly between:
  - an operative position, wherein the first modular cross bar assembly is secured at the first end to the first one of the front pair of support structures, spanning widthwise across a major portion of the outer body surface; and
  - a stowed position, wherein the first modular cross bar assembly is secured to a second one of the rear pair of support structures, to form a continuous span between the second ones of the pairs of front and rear support structures;
- the latching module including a housing which is substantially fully inserted into the first end of the central portion, to form an appearance of a continuous surface with the central portion; and
- the pivot module including a housing having an outer cover portion, and wherein the housing is substantially housed within the second end of the central portion, and wherein only the outer cover portion extends out from the second end of central portion.

* * * * *